(12) United States Patent
Trombley

(10) Patent No.: US 6,456,299 B1
(45) Date of Patent: Sep. 24, 2002

(54) MAP MAKING PROCESS

(76) Inventor: Joseph R. Trombley, 2312 Gemini St., Houston, TX (US) 77058-2035

( * ) Notice: Subject to any disclaimer, the term of this patent is extended or adjusted under 35 U.S.C. 154(b) by 0 days.

(21) Appl. No.: 09/447,377

(22) Filed: Nov. 23, 1999

Related U.S. Application Data

(60) Provisional application No. 60/124,548, filed on Mar. 15, 1999.

(51) Int. Cl.$^7$ .......................... G09G 5/00; G01C 21/30; G06E 7/00; G08G 1/123
(52) U.S. Cl. ..................... 345/629; 701/208; 304/990; 304/995; 707/100
(58) Field of Search ..................... 345/629; 701/213, 701/208, 200; 707/100, 102; 342/452; 340/990, 995

(56) References Cited

U.S. PATENT DOCUMENTS

| | | |
|---|---|---|
| 4,687,230 A | 8/1987 | Landry et al. |
| 4,796,920 A | 1/1989 | Landry et al. |
| 4,939,661 A * | 7/1990 | Barker et al. ............... 701/200 |
| 5,592,382 A * | 1/1997 | Colley et al. ............... 701/207 |
| 5,913,918 A * | 6/1999 | Nakano et al. ............. 701/208 |
| 6,092,076 A * | 7/2000 | McDonough et al. ....... 707/102 |

* cited by examiner

*Primary Examiner*—Jeffery Brier
*Assistant Examiner*—Anthony J. Blackman
(74) *Attorney, Agent, or Firm*—Kenneth H. Johnson

(57) ABSTRACT

A process for producing a recreational map preferably using a computer operated program by first producing a bordered area; overlaying said bordered area with one or more template maps having nautical features thereon, a first scale and latitude and longitude lines at least every two minutes of angle; adjusting the size of said template map(s) to match the bordered area and incorporating said nautical features and said latitude and longitude lines into said bordered area to provide a master template map; overlaying the master template map with at least one large scale map having nautical features also shown on the small scale map thereon and a second scale, said second scale being larger than first scale, adjusting the scale of said large scale map to match the latitude and longitude lines of said master template map and creating a product map comprising said master template map and said large scale map wherein the small scale and large scale maps have the same scale.

17 Claims, No Drawings

MAP MAKING PROCESS

This application claims the benefit of provisional application Ser. No. 60/124,548, filed Mar. 15, 1999.

BACKGROUND OF THE INVENTION

1. Field of the Invention

The present invention relates to a method for producing nautical maps useful for recreational and fishing information. In particular the present invention describes the process for producing nautical maps that provide greater details of an area than available from government maps.

2. Related Information

Recreational fishing is a widely enjoyed sport. Through research the inventor obtains fishing locations, marina locations, boat ramp locations and other general and cartographic information for a selected fishing map area. In addition to those features the maps provide accurate cartographic information derived from government maps. The map can also have Global Positioning Satellite (GPS) numbers added to either choice fishing sites or various land marks which are shown on the maps. The government charts available, for example, from the U.S. National Oceanic and Atmospheric Administration are excellent and greatly appreciated documents which are graciously provided by the U.S. government and provide the basis for all useful non governmental charts. However, these charts are directed more to larger commercial vessels and not to sport fishing or recreational use.

Nautical recreational and fishing maps and charts usually contain a small scale chart of a general area and one or more large scale inserts of the entire small scale chart or selected areas of the small scale chart.

A small scale chart is one in which features are present in smaller size and less detail than on a large scale chart. The distinction between a "small scale" and "large scale" is relative. For example, ocean charts may have scales of 1:1,000,000 whereas charts of harbors, shoreline and the like may have scales of 1:40,000 or less. Thus in this example the ocean charts are small scale and the harbor, shoreline, etc. charts are large scale.

It is an advantage of the present invention that a process is provided that incorporates the benefits of the governmental navigation charts with other useful and beneficial information for fishermen and leisure boaters.

SUMMARY OF THE INVENTION

Briefly the present invention is a process for producing a map comprising: producing a bordered area; overlaying said bordered area with a first template map having nautical features thereon, a first scale and latitude and longitude lines at least every two minutes of angle; adjusting the size of said first template map to match the bordered area and incorporating said nautical features and said latitude and longitude lines into said bordered area to provide a master template map; overlaying said master template map with at least one large scale map having nautical features appearing on said first template map thereon and a second scale, said second scale being larger than first scale, adjusting the scale of said large scale map to match the latitude and longitude lines of said master template map and creating a product map comprising said master template map and said large scale map. By adjusting the scale of the large scale map to that of the template map brings both the small scale map of the master template map and the large scale map to the same scale on the product map.

In the process of making the new recreational maps of the present invention, it is often the case that the area to be covered by the product map, i.e., the bordered area is different from the first template map. In that case a second template map is used to cover the remaining area of the bordered area not covered by the first template map. The second template map may have the same scale or a different scale (larger or smaller) than the first template map. The second template map is applied to the bordered area in the same manner as the described above for the first template map. If necessary there may be additional template maps to cover bordered areas not covered by the first two. The resulting product map is thus a new map of different scale than the template map or maps, which may cover a different area than the template map(s) and having different indicia thereon than the template map(s).

Preferably Global Positioning Satellite numbers for sites and/or other indicia of features and objects, such as buoys, ship wrecks, oil platforms and the like are added to the master template map. These features and indicata may be added to either the small scale map or the large scale map(s) or both. A further embodiment comprises overlaying the master template map with at least one electronic aerial map by aligning geographic features of said electronic aerial map and said master template map.

In addition to these features, it is also preferred that the areas of map or off map areas are electronically inserted on the map. The inserts are "blow-ups" thus have a larger scale than the large scale map.

A preferred embodiment the process for producing a map comprising, in a computer operated program:

producing a bordered area;

overlaying said bordered area with a first electronic map having nautical features thereon, a first scale and latitude and longitude lines at least every two minutes of angle;

adjusting the size of said first electronic map to match the bordered area and incorporating said nautical features and said latitude and longitude lines into said bordered area to provide a master template map;

overlaying said master template map with at least one large scale electronic map having nautical features appearing on said first electronic map thereon and a second scale, said second scale being larger than first scale, adjusting the scale of said large scale map to match the latitude and longitude lines of said master template map and creating a product electronic map comprising said master template map and said large scale electronic map.

The electronic product map may be stored in any medium such as a hard drive, CD, or diskets and may be used electronically or used to print maps, preferably on water proof material. These maps in addition to providing useful cartographic information go beyond the utilitarian government charts to provide recreational information for fishing and diving.

DETAILED DESCRIPTION

The government maps which are used to provide the first map (small scale) have latitude and longitude markings only at every 10 minutes of angle or more, whereas the larger scale maps have them at every 2 minutes of angle or less, depending to some extent on how large the scale is. In a preferred embodiment the latitude and longitude markings are added to the small scale map to correspond to the latitude and longitude markings appearing on the largest scale electronic map incorporated into the product electronic map.

In the following example two computers are used for the production of the present map. It is not intended that this is in any way a limitation to the process. A single computer may be used for the entire process, however Apple Corporation Macintosh computers are presently particularly adapted to graphics while PC dos operating computers using "Windows" (Microsoft Corporation) currently have available a greater variety of mathematical programs.

EXAMPLE

Map Layouts

STEP 1—One or more small scale U.S. Government maps (non copyrighted) that cover the fishing area of interest are used. The border outline of the new fishing map(s) is hand drawn on the U.S. Government map(s). The border outline is drawn to be the same proportion as a standard fishing map size (24"×37").

STEP 2—More detailed U.S. Government maps (non copyrighted) which are usually of a larger scale are used to fill in the border outline area of the smaller scale map in step 1. On the small scale U.S. Government map(s), latitude-longitude lines are hand drawn (inside the border outline) at least every 2 minutes of angle. Latitude-longitude lines denote angle measurements around the earth from 0 to 360 degrees. The units of angle for present maps are given in degrees and minutes. The additional latitude-longitude lines are needed because the smaller scale U.S. Government maps have lines only at larger intervals (usually every 10 minutes of angle). The purpose of this step is to provide a latitude-longitude grid at the same interval as the latitude-longitude grids of large-scale maps in step 2.

On all the U.S. Government maps in steps 1 and 2, points are marked that denote where the specific latitude-longitude numbers are to be positioned. These numbers are commonly referred to as GPS numbers. Fishermen using their GPS satellite navigation equipment and the GPS numbers can more accurately locate a desired fishing location and other points of interest.

Obtaining Electronic Maps

The U.S. Government maps in steps 1 and 2 are scanned using a computer driven optical scanning system to create electronic copies. Each of the electronic copies is saved in two formats for use with two different computer systems, A and B. Computer system A is a Macintosh computer and computer system B is a PC/Windows system. The electronic files for both computers are scanned as "tif files", however, the formats vary slightly between computers A and B. For the Macintosh system, the electronic tif files will later be used to draw the map. For the PC/Windows system B, the electronic files will later be used to compute latitude-longitude numbers. The tif file format may vary for Macintosh computers due to the use of different hardware and software.

All the electronic tif files are conveniently copied to magnetic disks so they can be transported to computers A and B.

Obtaining Electronic Copies of Aerial Photographs

In some embodiments aerial photographs may be used to overlay the template. Aerial photographs of selected parts of the map area may be scanned to create electronic copies, using a computer driven optical scanning system. The electronic copies may be saved in formats for use with the Macintosh computer system. The electronic files will later be used in the Macintosh computer to draw any corrections involving the aerial photographs. All the electronic tif files may be copied to magnetic disks so they can be transported to computers A and B.

Using the Macintosh Computer to Create the New Map

The creation of the new fishing map is carried out using a Macintosh computer and a graphic arts illustration program, such as Freehand, a product of Macromedia, Inc. However, other graphic arts illustration programs may be used also.

Placing and Adjusting the Tif Files

A folder is created in the computer named for the particular map that is currently being started for the purpose of this example this map will be called map A. The Macintosh compatible tif files for map A are loaded in the computer from the magnetic disk into the folder.

The map A border (24"×37") is drawn using the Freehand program. The map drawing area dimension is set up to print on a 25"×38" sheet of waterproof paper. The small-scale tif file is selected. If there is more than one small-scale tif file, the one covering the biggest area of the map should be selected first. The small-scale tif file is placed on top of the newly created map A border using the graphic arts program and the small-scale tif file is also located in a separate layer in Freehand. The tif file is preferably colored and made transparent (the tif file is colored so that one tif file can be distinguished from another and they are made transparent so detail underneath the tif files can be seen). The small-scale tif file is adjusted (by enlarging and/or reducing and/or rotating) so its drawn-in border matches the newly created Map A border. Once the small-scale tif file is in place, the tif file layer is locked so it cannot be moved.

This adjusted small-scale tif file with its drawn-in latitude-longitude lines will be the master template for placement of all the other tif files. The latitude-longitude lines are drawn in using the locked small scale tif file as a template and the corresponding latitude-longitude numbers.

"Layers" for each of the remaining tif files are electronically created in the same manner. Using the newly drawn-in latitude-longitude lines, each tif file is placed in it's respective layer, and adjusted (by enlarging and/or reducing and/or rotating), so that latitude-longitude lines for each tif file match the drawn-in lines. The exception to matching the latitude-longitude lines is the placement of the aerial photograph tif files. They are placed by lining up geographic features because they have no latitude-longitude lines to match with the drawn in lines.

Once all the remaining tif files have been placed and adjusted, all the tif layers are locked into place so they cannot be moved.

Note that map A from this point forward may be completely recreated, using only the tif files as template or some or all of the tif files may be shown on the product map.

Drawing the Map

Using Freehand or other graphics program and the locked in tif templates, the map is now drawn and colored.

Determining Latitude-longitude Numbers

Map A will contain tables and indexes which list latitude-longitude numbers for various points of interest on the map which include for example, fishing spots, marinas, boat ramps, artificial reefs, natural reefs and diving spots.

To obtain these latitude-longitude numbers accurately, they are computed using a special computer program, such as GPS Pro. This program is used with a computer having a "Windows 95" or better operating system (computer system B). A computer folder is made for map A and the "computer system B" tif files (see OBTAINING ELECTRONIC FILES) are placed into this folder. In preparation for using GPS Pro, each tif file is rotated using a program, such as Paint Shop Pro so that north is at the top of the screen. Tif files that already have north at the top of the screen are not rotated.

Finally, each tif file with north at the top of the screen is placed into the GPS Pro program. Each tif file is next registered with it's "real world" latitude-longitude coordinate system so that the program will be able to read latitude-longitude numbers anywhere on the tif file. With the registration complete, each of the points (previously made in the MAP LAYOUT section) can now be selected, and the latitude-longitude numbers accurately read from the computer.

The map may be used as computer display or printout or prepared as printed charts preferably on waterproof synthetic material in color.

The invention claimed is:

1. A process for producing a map comprising: producing a bordered area;
    overlaying said bordered area with a first template map having nautical features thereon, a first scale and latitude and longitude lines at least every two minutes of angle; adjusting the size of said first template map to match the bordered area and incorporating said nautical features and said latitude and longitude lines into said bordered area to provide a master template map;
    locking said master template map to prevent change;
    overlaying said master template map with at least one large scale map having nautical features appearing on said first template map thereon and a second scale, said second scale being larger than first scale,
    adjusting the scale of said large scale map to match the latitude and longitude lines of said master template map,
    locking said master template map and said large scale map together and
    creating a fixed product map comprising said master template map and said large scale map locked together for printing.

2. The process according to claim 1 wherein Global Positioning Satellite numbers for sites and/or other indicia of features and objects are added prior to creating said product map.

3. The process according to claim 1 wherein the master template map is overlayed with at least one aerial map by aligning geographic features of said aerial map and said master template map.

4. The process according to claim 1 wherein at least one selected area of a map having a larger scale that said large scale map is electronically inserted onto said electronic map.

5. The process according to claim 1 wherein a portion of the bordered area not covered by the first template map is overlayed with a second template map.

6. The process according to claim 5 wherein the scale of said second template map is the same as the first template map.

7. The process according to claim 5 wherein the scale of said second template map is different from the first template map.

8. A process for producing a map comprising, in a computer operated program:
    producing a bordered area;
    overlaying said bordered area with a first electronic map having nautical features thereon, a first scale and latitude and longitude lines at least every two minutes of angle;
    adjusting the size of said first electronic map to match the bordered area and incorporating said nautical features and said latitude and longitude lines into said bordered area to provide a master template map;
    locking said master template map to prevent change;
    overlaying said master template map with at least one large scale electronic map having nautical features appearing on said first electronic map thereon and a second scale, said second scale being larger than first scale;
    adjusting the scale of said large scale map to match the latitude and longitude lines of said master template map
    locking said master template map and said large scale map together and
    creating a fixed product electronic map comprising said master template map and said large scale electronic map locked together for printing.

9. The process according to claim 8 wherein at least one selected area of a map having a larger scale that said large scale map is electronically inserted onto said electronic map.

10. The process according to claim 8 wherein a portion of the bordered area not covered by the first electronic map is overlayed with a second electronic map.

11. The process according to claim 10 wherein the scale of said second electronic map is the same as the first electronic map.

12. The process according to claim 10 wherein the scale of said second electronic map is different from the first electronic map.

13. A process for producing a map comprising:
    (a) producing a border area in a computer operated program;
    (b) overlaying a navigational map having a first scale with a border area;
    (c) adding latitude and longitude lines at least every two minutes of angle to produce a first scale map;
    (d) optically scanning said first scale map to create an electronic first scale map for use in a computer;
    (e) optically scanning at least one map of a second scale and having latitude and longitude lines thereon to create an electronic second scale map for use in a computer, said second scale being larger than first scale; (f) overlaying said first scale electronic map on said border area in said computer operated program;
    (g) adjusting said first scale electronic map to match the border area to create a master template map locking said master template map to prevent change;
    (h) transferring the added latitude and longitude lines from said master template map to said border area;
    (i) overlaying at least one second scale electronic map on said border area and matching the latitude and longitude lines of said second scale electronic map to the those of the master template map, locking said master template map and said large second scale electronic map together; and
    (j) Creating an electronic map comprising said border area, said master template map and said second scale electronic map wherein said border area, said master template map and said second scale electronic map are locked together for printing.

14. The process according to claim 10 wherein an aerial photograph corresponding to a portion of said first scale electronic map and having geographic features thereon correspond to features on said first scale electronic map is optically scanned to create an electronic aerial map for use in a computer and an electronic map is created comprising said border area, said master template map, second scale electronic map and said electronic areal map.

15. The process according to claim 10 wherein at least one selected area of a map having a larger scale that said large scale map is electronically inserted onto said electronic map.

16. A process for producing a map comprising: producing a bordered area;
   overlaying less than all of the bordered area with a first template map having nautical features thereon, a first scale and latitude and longitude lines at least every two minutes of angle; overlaying a portion of the bordered area not covered by the first template map with a second template map having a scale different from said first template,
   adjusting the size of said first template map and said second template to match the bordered area and incorporating said nautical features and said latitude and longitude lines into said bordered area to provide a master template map;
   overlaying said master template map with at least one large scale map having nautical features appearing on said first template map thereon and a second scale, said second scale being larger than first scale,
   adjusting the scale of said large scale map to match the latitude and longitude lines of said master template map and
   creating a product map comprising said master template map and said large scale map.

17. A process for producing a map comprising, in a computer operated program:
   producing a bordered area;
   overlaying less than all of said bordered area with a first electronic map having nautical features thereon, a first scale and latitude and longitude lines at least every two minutes of angle; overlaying a portion of the bordered area not covered by the first electronic map with a second electronic map having a scale different from said first template,
   adjusting the size of said first electronic map and said second electronic map to match the bordered area and incorporating said nautical features and said latitude and longitude lines into said bordered area to provide a master template map;
   overlaying said master template map with at least one large scale electronic map having nautical features appearing on said first electronic map thereon and a second scale, said second scale being larger than first scale;
   adjusting the scale of said large scale map to match the latitude and longitude lines of said master template map and
   creating a product electronic map comprising said master template map and said large scale electronic map.

* * * * *